United States Patent
Ogawa

(10) Patent No.: US 9,499,161 B2
(45) Date of Patent: Nov. 22, 2016

(54) PREDICTIVE AND ADAPTIVE MOVEMENT SUPPORT APPARATUS, MOVEMENT SUPPORT METHOD, AND DRIVING SUPPORT SYSTEM FOR A HYBRID VEHICLE FOR MODE DRIVING SECTION OPTIMIZATION

(71) Applicant: TOYOTA JIDOSHA KABUSHIKI KAISHA, Toyota-shi, Aichi-ken (JP)

(72) Inventor: Yuki Ogawa, Toyota-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/025,772

(22) PCT Filed: Oct. 1, 2014

(86) PCT No.: PCT/IB2014/001974
§ 371 (c)(1),
(2) Date: Mar. 29, 2016

(87) PCT Pub. No.: WO2015/049572
PCT Pub. Date: Apr. 9, 2015

(65) Prior Publication Data
US 2016/0221568 A1  Aug. 4, 2016

(30) Foreign Application Priority Data
Oct. 3, 2013 (JP) ................................ 2013-208273

(51) Int. Cl.
*B60W 20/12* (2016.01)
*B60W 50/00* (2006.01)
(Continued)

(52) U.S. Cl.
CPC .............. *B60W 20/12* (2016.01); *B60W 10/06* (2013.01); *B60W 10/08* (2013.01); *B60W 10/26* (2013.01);
(Continued)

(58) Field of Classification Search
CPC .... B60W 20/12; B60W 20/14; B60W 20/40; B60W 10/06; B60W 10/08; B60W 10/26; B60W 30/18127; B60W 50/0097; B60W 2510/244; B60W 2520/10; B60W 2550/143; B60W 2550/22; B60W 2550/402; F02D 29/07; Y02T 10/6291; Y02T 10/84; Y01S 903/904; Y01S 903/947
USPC .......................................................... 701/22
See application file for complete search history.

(56) References Cited

U.S. PATENT DOCUMENTS

2010/0185384 A1  7/2010  Naito et al.
2011/0276209 A1  11/2011  Suganuma et al.
(Continued)

FOREIGN PATENT DOCUMENTS

EP  2071285 A1  6/2009
EP  2679461 A1  1/2014
(Continued)

OTHER PUBLICATIONS

Partial Translation of Nov. 25, 2015 Office Action issued in Japanese Patent Application No. 2013-208273.

*Primary Examiner* — McDieunel Marc
*Assistant Examiner* — James E Stroud
(74) *Attorney, Agent, or Firm* — Oliff PLC

(57) ABSTRACT

A movement support apparatus that supports movement of a vehicle having an internal combustion engine and a motor as drive sources from a current location to a destination includes: a setup unit that sets up any driving mode of an EV mode and an HV mode for each section, into which a driving route from the current location to the destination is partitioned, when a running load for running in each section is set; and a change unit that changes the driving mode in a part of each section of the driving route to a driving mode other than the driving mode set up by the setup unit on: the basis of at least one of a running environment including a running state of the vehicle and a road environment and the miming load as consumption of the battery necessary for running in the EV mode.

11 Claims, 9 Drawing Sheets

(51) Int. Cl.
*B60W 10/06* (2006.01)
*B60W 10/08* (2006.01)
*B60W 10/26* (2006.01)
*B60W 30/18* (2012.01)
*B60W 20/00* (2016.01)
*F02D 29/02* (2006.01)

(52) U.S. Cl.
CPC .............. *B60W 20/14* (2016.01); *B60W 20/40* (2013.01); *B60W 30/18127* (2013.01); *B60W 50/0097* (2013.01); *F02D 29/02* (2013.01); *B60W 2510/244* (2013.01); *B60W 2520/10* (2013.01); *B60W 2550/143* (2013.01); *B60W 2550/22* (2013.01); *B60W 2550/402* (2013.01); *Y02T 10/6291* (2013.01); *Y02T 10/84* (2013.01); *Y10S 903/904* (2013.01); *Y10S 903/947* (2013.01)

(56) References Cited

U.S. PATENT DOCUMENTS

| | | | | |
|---|---|---|---|---|
| 2014/0244082 | A1* | 8/2014 | Caron | ................... B60L 11/005 701/22 |
| 2015/0336566 | A1* | 11/2015 | Johri | ..................... B60W 10/26 701/22 |
| 2016/0023554 | A1* | 1/2016 | Tseng | ........................ B60L 3/12 701/22 |
| 2016/0090006 | A1* | 3/2016 | Yamazaki | ........... B60L 15/2063 701/22 |
| 2016/0107632 | A1* | 4/2016 | Yang | ..................... B60W 20/30 701/22 |
| 2016/0207522 | A1* | 7/2016 | Pandit | ...................... B60K 6/40 |
| 2016/0214504 | A1* | 7/2016 | Park | ........................ B60L 3/12 |
| 2016/0229391 | A1* | 8/2016 | Shigemoto | ............... B60K 6/48 |
| 2016/0229411 | A1* | 8/2016 | Murata | ................. B60L 11/123 |

FOREIGN PATENT DOCUMENTS

| | | |
|---|---|---|
| JP | 2009-012605 A | 1/2009 |
| JP | 2010-120552 A | 6/2010 |
| JP | 2010-169419 A | 8/2010 |
| JP | 2011-020571 A | 2/2011 |
| WO | 2012/114446 A1 | 8/2012 |
| WO | 2014/080803 A1 | 5/2014 |

* cited by examiner

PREDICTIVE AND ADAPTIVE MOVEMENT SUPPORT APPARATUS, MOVEMENT SUPPORT METHOD, AND DRIVING SUPPORT SYSTEM FOR A HYBRID VEHICLE FOR MODE DRIVING SECTION OPTIMIZATION

BACKGROUND OF THE INVENTION

1. Field of the Invention

The present invention relates to a movement support apparatus, a movement support method, and a driving support system including a movement support function.

2. Description of Related Art

As a vehicle having plural driving modes, a hybrid vehicle is known which uses an internal combustion engine and a motor as a drive source in parallel. The hybrid vehicle has a first mode (HV mode) in which only the internal combustion engine is used or the internal combustion engine and the motor are simultaneously used and a second mode (EV mode) in which the internal combustion engine is stopped and only the motor is used as the plural driving modes. A movement support apparatus including a navigation system mounted in the hybrid vehicle calculates a driving route from a current location to a destination on the basis of map information or road traffic information, or the like and performs supports of selecting a driving mode to be applied to sections into which the driving route is partitioned. For example, Japanese Patent Application Publication No. 2009-12605 (JP 2009-12605 A) describes an example of a controller of the vehicle having the movement support function.

However, in the controller of the vehicle described in JP 2009-12605 A, the driving mode of each section of the driving route is set in consideration of balancing energy consumption during the entire driving route so that a state of charge of a battery, which is a secondary battery, at the destination approaches the lower limit. On the other hand, in general, since the driving mode is set up in units of sections into which the driving route is partitioned for each link of map data or the like, the HV mode may be suitable for a part of a section for which the EV mode is set up or the EV mode may be suitable for a part of a section for which the HV mode is set up. For example, when the vehicle runs in the EV mode in a section for which the HV mode is suitable, power of a battery is consumed more than is required. When the vehicle runs in the HV mode in a section for which the EV mode is suitable, a running distance in the EV mode to be originally covered cannot be added.

This problem is common in an apparatus or a method of allocating a driving mode in a vehicle with plural driving modes having different energy balances.

SUMMARY OF THE INVENTION

The invention provides a movement support apparatus, a movement support method, and a driving support system having a movement support function that can promote proper switching of a driving mode for a section in a driving route.

According to a first aspect of the invention, there is provided a movement support apparatus that supports movement of a vehicle having an internal combustion engine and a motor as drive sources from a current location to a destination, including: a setup unit that sets up any driving mode of an EV mode in which the motor using a battery is used as the drive source and an HV mode in which at least the internal combustion engine is used as the drive source for each section, into which a driving route from the current location to the destination is partitioned, when a running load for running in each section is set; and a change unit that changes the driving mode in a part of each section of the driving route to a driving mode other than the driving mode set up by the setup unit on the basis of at least one of a running environment including a running state of the vehicle and a road environment and the running load as consumption of the battery necessary for running in the EV mode.

According to a second aspect of the invention, there is provided a movement support method of supporting movement of a vehicle having an internal combustion engine and a motor as drive sources from a current location to a destination, including: setting up any driving mode of an EV mode in which the motor using a battery is used as the drive source and an HV mode in which at least the internal combustion engine is used as the drive source for each section, into which a driving route from the current location to the destination is partitioned, when a running load for running in each section is set; and changing the driving mode in a part of each section of the driving route to a driving mode other than the set-up driving mode on the basis of at least one of a running environment including a running state of the vehicle and a road environment and the running load as consumption of the battery necessary for running in the EV mode.

In the movement support apparatus, the change unit may change the driving mode of the section, for which the EV mode is set up, to the HV mode on the condition that the vehicle is decelerated and then accelerated in the corresponding section.

The movement support method may further include changing the driving mode of the section, for which the EV mode is set up, to the HV mode on the condition that the vehicle is decelerated and then accelerated in the corresponding section.

In the movement support apparatus, the change unit may change the driving mode of the section, for which the EV mode is set up, to the HV mode on the condition that a remaining distance in the corresponding section up to a next section is less than a predetermined distance.

In the movement support apparatus, the change unit may change the driving mode of the section, for which the EV mode is set up, to the HV mode on the condition that the HV mode is set up for the section next to the corresponding section.

In the movement support apparatus, the change unit may change the driving mode of the section in which regenerative energy is obtained from the HV mode to the EV mode when the regenerative energy is obtained at the time of entry from the section for which the EV mode is set up by the setup unit into the section for which the HV mode is set up.

In the movement support apparatus, the change unit may re-change the driving mode of the section, for which the HV mode is set up, to the HV mode when at least one condition of a condition that a predetermined time elapses after the driving mode of the section for which the HV mode is set up is changed to the EV mode and a condition that the vehicle runs a predetermined distance thereafter is satisfied.

In the movement support apparatus, determination of whether to change the driving mode by the change unit may be performed in a cycle shorter than a setup cycle by the setup unit after the driving mode of the vehicle is set up by the setup unit.

According to a third aspect of the invention, there is provided a driving support system that supports driving of a vehicle having an internal combustion engine and a motor as drive sources on the basis of one driving mode selected from a plurality of driving modes different from each other, which is set up for sections into which a driving route of the vehicle is partitioned from a current location to a destination, including: the movement support apparatus according to any one of the above-mentioned aspects that sets up one driving mode selected from the plurality of driving modes for each section of the driving route and changes the driving mode if necessary.

According to the above-mentioned aspects, it is possible to promote proper switching of a driving mode for a section of a driving route.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a movement support apparatus, a movement support method, and a driving support system according to a first embodiment of the invention will be described with reference to FIGS. 1 to 4. The movement support apparatus, the movement support method, and the driving support system according to this embodiment are applied to a hybrid vehicle having as drive sources an electric motor using a battery such as a secondary battery as a drive source and an internal combustion engine using gasoline or other fuel as a drive source.

Figure 1:
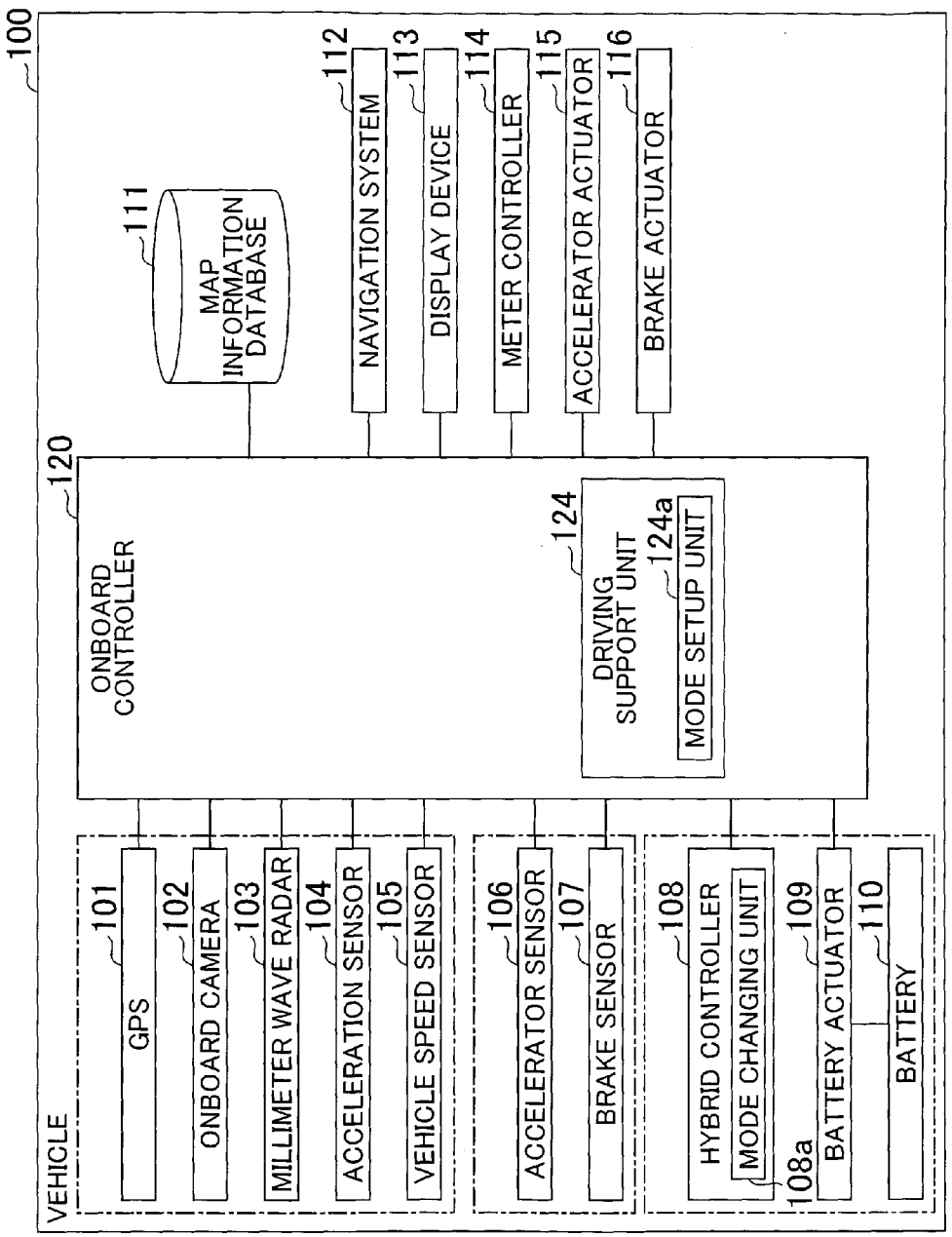
FIG. 1 is a block diagram schematically illustrating a configuration of a movement support apparatus according to a first embodiment of the invention.

As illustrated in FIG. 1, the vehicle 100 is provided with, for example, a global positioning system (GPS) 101, an onboard camera 102, a millimeter wave radar 103, an acceleration sensor 104, and a vehicle speed sensor 105 as devices for detecting a running state of the vehicle 100. The GPS 101, the onboard camera 102, the millimeter wave radar 103, the acceleration sensor 104, and the vehicle speed sensor 105 are connected on an onboard controller 120 that controls various functions of the vehicle via an onboard network such as a controller area network (CAN). The onboard controller 120 is a so-called electronic control unit (ECU) and includes a microcomputer having a computation device and a storage device. The onboard controller 120 can perform various controls by causing the computation device to compute programs or parameters stored in the storage device.

The GPS 101 receives signals from GPS satellites and detects the position of the vehicle 100, for example, as latitude and longitude on the basis of the received signals from the GPS satellites. The GPS 101 outputs position information indicating the detected position (latitude and longitude) of the vehicle 100 to the onboard controller 120. The onboard camera 102 captures an image of a surrounding environment of the vehicle 100 and outputs the captured image data to the onboard controller 120. The millimeter wave radar 103 detects an object present around the vehicle 100 using radio waves of a millimeter waveband and outputs a signal corresponding to the detection result to the onboard controller 120.

The acceleration sensor 104 detects the acceleration of the vehicle 100 and outputs a signal corresponding to the detected acceleration to the onboard controller 120. The vehicle speed sensor 105 detects the rotation speed of vehicle wheels of the vehicle 100 and outputs a signal corresponding to the detected rotation speed to the onboard controller 120.

The accelerator sensor 106 detects a degree of operation of an accelerator pedal by a driver and outputs a signal corresponding to the detected degree of operation of the accelerator pedal to the onboard controller 120. The brake sensor 107 detects a degree of operation of a brake pedal by the driver and outputs a signal corresponding to the detected degree of operation of the brake pedal to the onboard controller 120.

The vehicle 100 is provided with an accelerator actuator 115 for controlling the operation state of the internal combustion engine and a brake actuator 116 for controlling the brake. The accelerator actuator 115 and the brake actuator 116 are electrically connected to the onboard controller 120. The accelerator actuator 115 controls the internal combustion engine on the basis of a control quantity of the internal combustion engine calculated by the onboard controller 120 based on the detected value of the accelerator sensor 106. The brake actuator 116 controls the brake on the basis of a control quantity of the brake calculated by the onboard controller 120 based on the detected value of the brake sensor 107.

The vehicle 100 is provided with a battery 110 as a drive source of an electric motor and a battery actuator 109 for controlling charging and discharging of the battery 110. The battery actuator 109 is electrically connected to the onboard controller 120. The battery actuator 109 manages the charging and discharging of the battery 110. The battery actuator 109 drives the electric motor by controlling the discharging of the battery 110 or charges the battery 110 by regeneration of the electric motor.

The vehicle 100 is provided with a hybrid controller 108 that controls the operation states of the internal combustion engine and the electric motor. The hybrid controller 108 is electrically connected to the onboard controller 120. That is, the hybrid controller 108 is electrically connected to the battery actuator 109, the accelerator actuator 115, and the brake actuator 116 via the onboard controller 120. The hybrid controller 108 is also a so-called ECU and includes a microcomputer having a computation device and a storage device. The hybrid controller 108 can perform various controls by causing the computation device to compute programs or parameters stored in the storage device.

The hybrid controller 108 determines a driving power distribution ratio (output ratio) of the internal combustion engine and the electric motor, for example, on the basis of the detection results of the acceleration sensor 104, the vehicle speed sensor 105, and the accelerator sensor 106 which are input from the onboard controller 120. Particularly, the hybrid controller 108 can adjust the state of charge of the battery 110 which is the residual energy of the battery 110 by changing the driving power distribution ratio (output ratio) of the internal combustion engine and the electric motor.

The hybrid controller 108 generates a control command for the battery actuator 109 relevant to discharging of the battery 110 or information on the control quantity of the internal combustion engine calculated by the onboard controller 120 on the basis of the driving power distribution ratio. The hybrid controller 108 determines the braking force distribution ratio of the brake and the electric motor, for example, on the basis of the detection results of the acceleration sensor 104, the vehicle speed sensor 105, and the brake sensor 107 input from the onboard controller 120. The hybrid controller 108 generates a control command for the battery actuator 109 relevant to charging of the battery 110 or information on the control quantity of the brake calculated by the onboard controller 120 on the basis of the braking force distribution ratio. That is, the hybrid controller 108 controls the charging and discharging of the battery 110 by outputting the generated control commands, to the battery actuator 109. Accordingly, the electric motor using the battery 110 as a drive source (power source) is driven by the discharging of the battery 110 or the battery 110 is charged by the regeneration of the electric motor. The onboard controller 120 can monitor the performance situation of the hybrid control or the state of charge of the battery 110.

The vehicle 100 includes an EV mode in which the vehicle 100 runs using the electric motor, which uses the battery 110 as a drive source, as a drive source and an HV mode in which the vehicle 100 runs using only the internal combustion engine or the electric motor and the internal combustion engine in parallel as a drive source. The hybrid controller 108 performs the control of switching the driving mode to the EV mode and the HV mode depending on the driver's selection result in the vehicle 100. The hybrid controller 108 has a function of automatically switching the driving mode to the EV mode and the HV mode and performs the control of switching the driving mode to the EV mode and the HV mode on the basis of information on running loads required for running in the sections of the driving route of the vehicle 100, which is input from the onboard controller 120. The running load is a load per unit distance in a section and is an average load required for running in the section. On the other hand, the accumulated value of the running load required for fully running in the section is defined as energy consumption.

However, the vehicle 100 includes map information database 111 in which map data is registered. The map data is data on geography such as roads. In the map data, information on a position such as latitude and longitude is registered along with data capable of displaying the geography. In the map data, at least one of crossroad names, road names, direction names, direction guides, and facility information may be registered.

The map information database 111 includes node data which is information on nodes indicating positions on roads and link data which is information on links, as a section between two nodes. The node is set as a position of a specific traffic element such as a crossroad, a traffic signal, and a curve, a point at which the number of lanes is changed, or the like. The node data includes position information of a node, road information of the position, and the like on a road. The link is set as a section between two nodes and defined by two nodes. The link data includes information of the two nodes, road information of the section of the link, and the like. The running load can be acquired or calculated from running load information included in the link data. The road information of the section of a link includes information such as a start point position, an end point position, a distance, a route, and undulations. The link data may include a variety of data such as cost data including the running load of a section as a link, road data including road types, mark data indicating a specific position, a crossroad data indicating information of a crossroad, and facility data indicating facility information.

Specifically, the node data may include, for example, a node ID as an identification number of a node, a coordinate of the node, link IDs of all links connected to the node, and a node type indicating the type of a crossroad or a merging point. The node data may include data indicating characteristics of the node such as an image ID which is an identification number of an image indicating the node.

The link data may include, for example, a link ID as an identification number of a link, a link length, and node IDs of nodes connected to the start point and the end point. The link data may include necessary information out of data indicating road types such as an express way, a toll road, a general road, a urban road/suburban road, and a mountain road, a road width, the number of lanes, a link running time, a legal speed limit, and the gradient of the road. The link data may include data indicating the average values, the maximum values, the minimum values, and the like of moving times, moving speeds, fuel consumption, and power consumption as the running load information which is a necessary output of the vehicle 100 in each link. The power consumption is an amount of power which is consumed by the electric motor when the vehicle 100 runs in the EV mode. The running load of a link (section) is acquired or calculated on the basis of the running load information. The running load is an average value in the link (section) and has a unit of [kW]. The energy consumption as the accumulated value of the running load required for fully running in each link (section) can be calculated from the running load and the link length (section length).

The vehicle 100 is provided with a navigation system 112 performing route guidance or the like. The navigation system 112 acquires the current point (latitude and longitude) of the vehicle 100 from the onboard controller 120 to which the detection result of the GPS 101 is input. The navigation system 112 specifies a target point (latitude and longitude) when the target point is set by the driver. Then, the navigation system 112 searches for the driving route from the current point of the vehicle 100 to the destination with reference to the map information database 111, for example, using a Dijkstra method. The navigation system 112 calculates, for example, the running load, the moving time, the moving speed, the fuel consumption, and the power consumption in the searched driving route. The navigation system 112 outputs information indicating the searched driving route, the calculated running load, moving time, moving speed, fuel consumption, and power consumption to the onboard controller 120 and outputs the information to a display device 113 constituted by a liquid crystal display disposed in the vehicle interior via the onboard controller 120.

The vehicle 100 is provided with a meter controller 114 that controls a display situation of a meter displayed on an instrument panel disposed in a dash board. The meter controller 114 acquires, for example, data indicating the charging and discharging state of the battery 110 from the onboard controller 120, and visually displays, for example, an energy flow in the vehicle 100 on the basis of the acquired data. The energy flow is a flow of energy in the vehicle 100 caused by the charging and discharging of the battery 110, the driving power/regeneration of the electric motor, and the like. The energy flow may include a flow of energy in the vehicle 100 caused by the driving power of the internal combustion engine.

When a driving route is input, the onboard controller 120 allocates the driving modes to the sections of the driving route. The onboard controller 120 includes a driving support unit 124 that supports the allocation of the driving modes based on the driving route. The driving support unit 124 acquires information of the driving route from the navigation system 112 to the target point set by the driver. The driving support unit 124 includes a mode setup unit 124a that sets up the driving modes to be allocated to the sections of the acquired driving route. The mode setup unit 124a constitutes a movement support apparatus and the functions thereof are carried out by causing the onboard controller 120 to execute a program or the like. The mode setup unit 124a has a function of setting up the driving mode of each section depending on the running loads of the sections of the driving route.

In general, it tends to be efficient that the running using the electric motor is applied to a section having a small running load and it tends to be efficient that the running using the internal combustion engine is applied to a section having a large running load. Accordingly, the onboard controller 120 allocates the EV mode to a section having a small running load and allocates the HV mode to a section having a large running load.

The mode setup unit 124a compares the running loads of plural target sections and sequentially allocates the EV mode to the sections having lower running loads. The mode setup unit 124a integrates the energy consumption of the sections to which the EV mode is allocated and subtracts the integrated energy consumption from the state of charge of the battery 110. Then, the mode setup unit 124a continues to allocate the EV mode to the sections of the driving route so that the integrated energy consumption is not greater than the state of charge of the battery 110. Accordingly, the mode setup unit 124a allocates the EV mode to the sections having a relatively low running load out of the sections of the driving route. The mode setup unit 124a allocates the HV mode to the sections to which the EV mode is not allocated.

The mode setup unit 124a outputs the driving modes set up for the sections of the driving route to the display device 113 as described above and displays the driving mode set up for the section in which the vehicle is running on the display device 113.

The hybrid controller 108 specifies the section in which the vehicle is currently running by appropriately acquiring position information at which the vehicle is currently running from the onboard controller 120, and causes the vehicle 100 to run in the driving mode set up for the specified section. That is, the hybrid controller 108 switches the driving mode of the vehicle 100 to the EV mode or the HV mode allocated to the corresponding section whenever the driving route of the vehicle 100 is changed. Accordingly, the vehicle 100 runs in the driving mode set up for the section in which the vehicle is currently running. The hybrid controller 108 includes a mode changing unit 108a that changes the setup of the driving mode allocated to the sections of the acquired driving route. The mode changing unit 108a constitutes the movement support apparatus and the functions are carried out by causing the hybrid controller 108 to execute a program or the like. The mode changing unit 108a has a function of changing the driving modes of the sections depending on the state of charge of the battery 110.

However, since the driving mode is set in units of uniformly-partitioned sections for each link of map data or the like, the HV mode may be suitable in a part of a section for which the EV mode is set up.

Accordingly, the mode changing unit 108a changes the driving mode in a part of a section of the driving route to a driving mode other than the driving mode set up by the mode setup unit 124a depending on the running load. The mode changing unit 108a changes the driving mode depending on a predetermined condition. An example of the predetermined condition is a combination of a condition in which the driving mode of the section in which the vehicle is currently running is set up as the EV mode, a condition in which the vehicle 100 is stopped, a condition in which the remaining distance of the section in which the vehicle is currently running is less than a predetermined distance, a condition in which the HV mode is set up for a next section, and a condition in which the vehicle speed is greater than a vehicle speed threshold. When the vehicle 100 is temporarily stopped and then the vehicle speed becomes greater than the vehicle speed threshold, it is determined that the vehicle 100 is decelerated and then accelerated.

Figure 2:
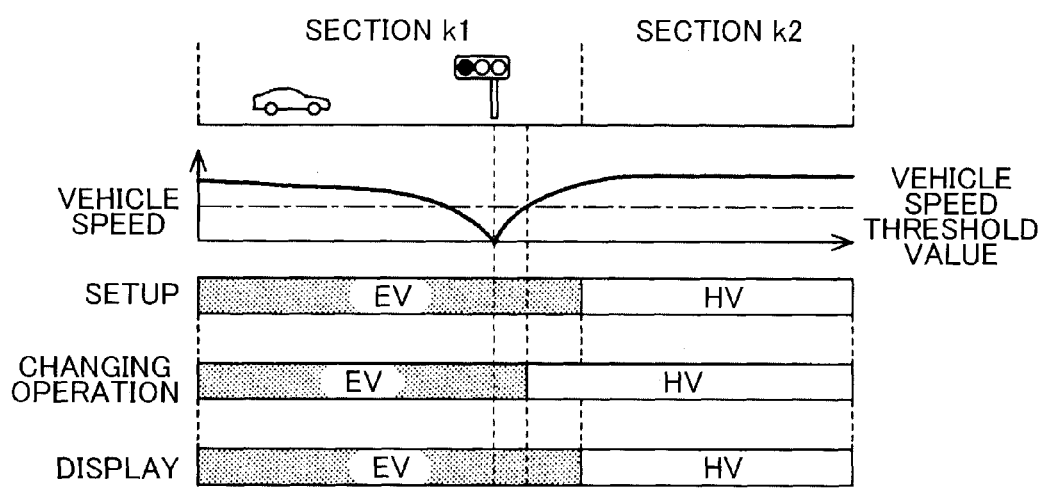
FIG. 2 is a diagram illustrating a part of a driving route that is set up by the movement support apparatus according to the first embodiment.

An example of the driving route to be subjected to the setup or changing of the driving mode will be described below with reference to FIG. 2. As illustrated in FIG. 2, it is assumed that a part of the driving route searched for by the navigation system 112 includes a first section k1 and a second section k2. In the first section k1, a traffic signal is present immediately before the second section k2. The traffic signal is located at a position at which the remaining distance in the first section k1 is less than a predetermined distance. The vehicle 100 is stopped or decelerated depending on the color of a signal lamp of the traffic signal. FIG. 2 illustrates a vehicle speed when the vehicle 100 is stopped at a red signal and is then started. It is assumed that information on the running load and the energy consumption in each of the first section k1 and the second section k2 is acquired from the map information database 111. The mode setup unit 124a sets up the driving mode on the basis of the state of charge of the battery 110, the running loads and the energy consumption of the first section k1 and the second section k2. The driving mode of the first section k1 is set up to the EV mode. The driving mode of the second section k2 is set up to the HV mode.

An example of a driving mode setting-up process in the driving support unit 124 will be described below with reference to FIG. 3. The driving support unit 124 allocates the driving mode to each section of a driving route whenever the driving route is transmitted from the navigation system 112.

Figure 3:
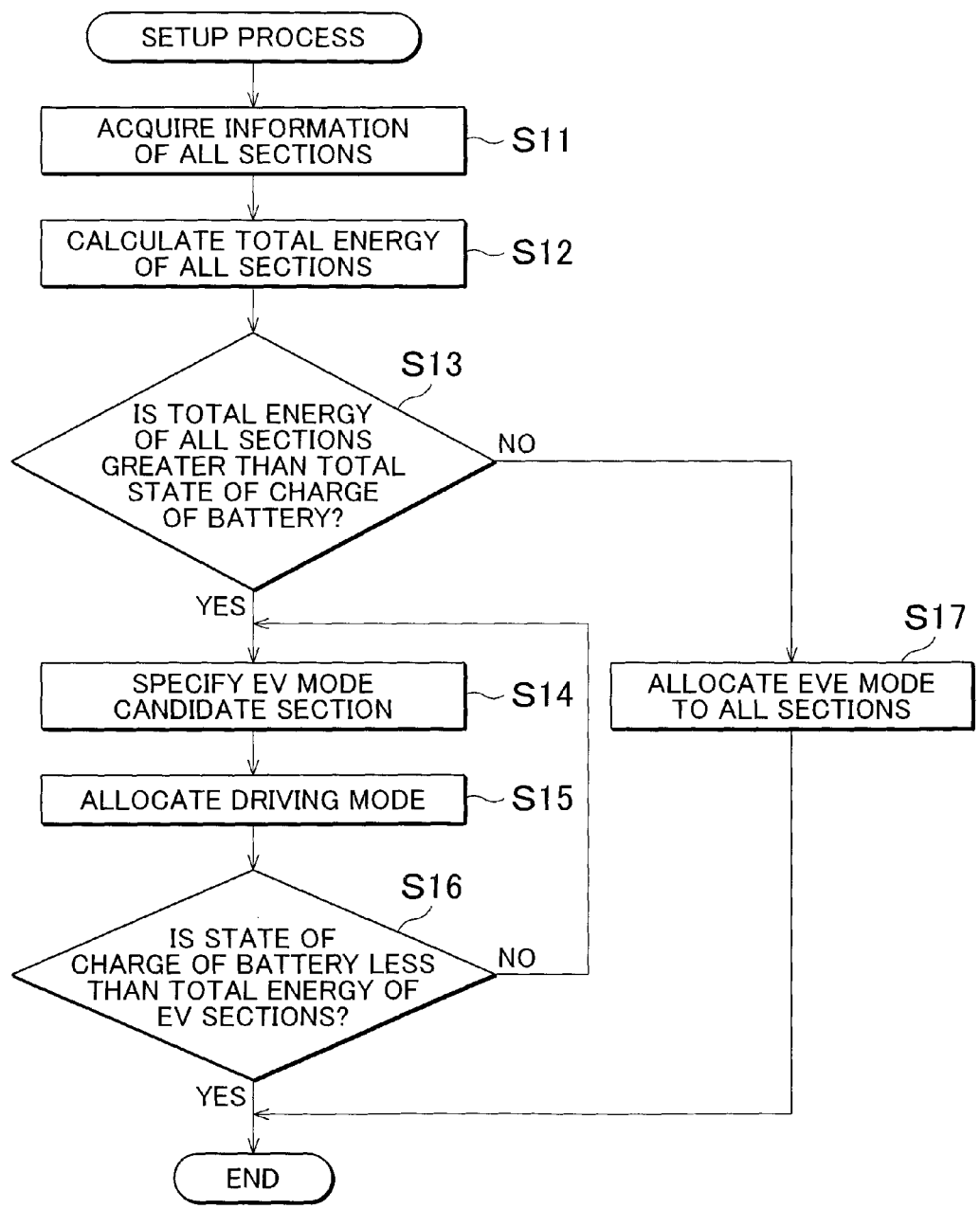
FIG. 3 is a flowchart illustrating a process flow of a driving mode setting-up process that is performed by the movement support apparatus according to the first embodiment.

As illustrated in FIG. 3, when a target point is set by the navigation system 112, the driving support unit 124 acquires route information of all the sections of the driving route (step S11). Then, the driving support unit 124 calculates the total energy consumption on the basis of the acquired information on all the sections (step S12) and determines whether the total energy consumption of all the sections is greater than the state of charge of the battery 110 (step S13). That is, the mode setup unit 124*a* determines whether the vehicle can run in the EV mode in all the sections. When it is determined that the total energy consumption of all the sections is not greater than the state of charge of the battery 110 (NO in step S13), the driving support unit 124 allocates the EV mode to all the sections (step S17) and ends the driving mode setting-up process.

On the other hand, when it is determined that the total energy consumption of all the section is, greater than the state of charge of the battery 110 (YES in step S13), the driving support unit 124 specifies sections, which are candidates to which the EV mode is allocated out of all the sections, as candidate sections (step S14). The driving support unit 124 allocates the EV mode to the specified candidate sections and allocates the HV mode to the other sections (step S15).

Then, the driving support unit 124 determines whether the state of charge of the battery is less than the total energy consumption of the sections for which the EV mode is set (step S16). When it is determined that the state of charge of the battery 110 is equal to or greater than the total energy consumption of the sections for which the EV mode is set (NO in step S16), the driving support unit 124 performs the process of step S14. That is, the mode setup unit 124*a* specifies the candidate sections of the EV mode again when the state of charge of the battery 110 is not sufficient.

On the other hand, when it is determined that the state of charge of the battery is less than the total energy consumption of the sections for which the EV is set (YES in step S16), the driving support unit 124 ends the driving mode setting-up process. The driving mode is set up for each section of the driving route illustrated in FIG. 2 by this setup process.

An example of a driving mode changing process in the hybrid controller 108 will be described below with reference to FIG. 4. The mode changing unit 108*a* of the hybrid controller 108 changes the driving mode which has been set up by the mode setup unit 124*a* after being set up by the mode setup unit 124*a* of the driving support unit 124. The change cycle which is a cycle of the determination of whether to change the driving mode in the mode changing unit 108*a* is set to be shorter than a setup cycle which is a cycle of the setup in the mode setup unit 124*a*.

Figure 4:
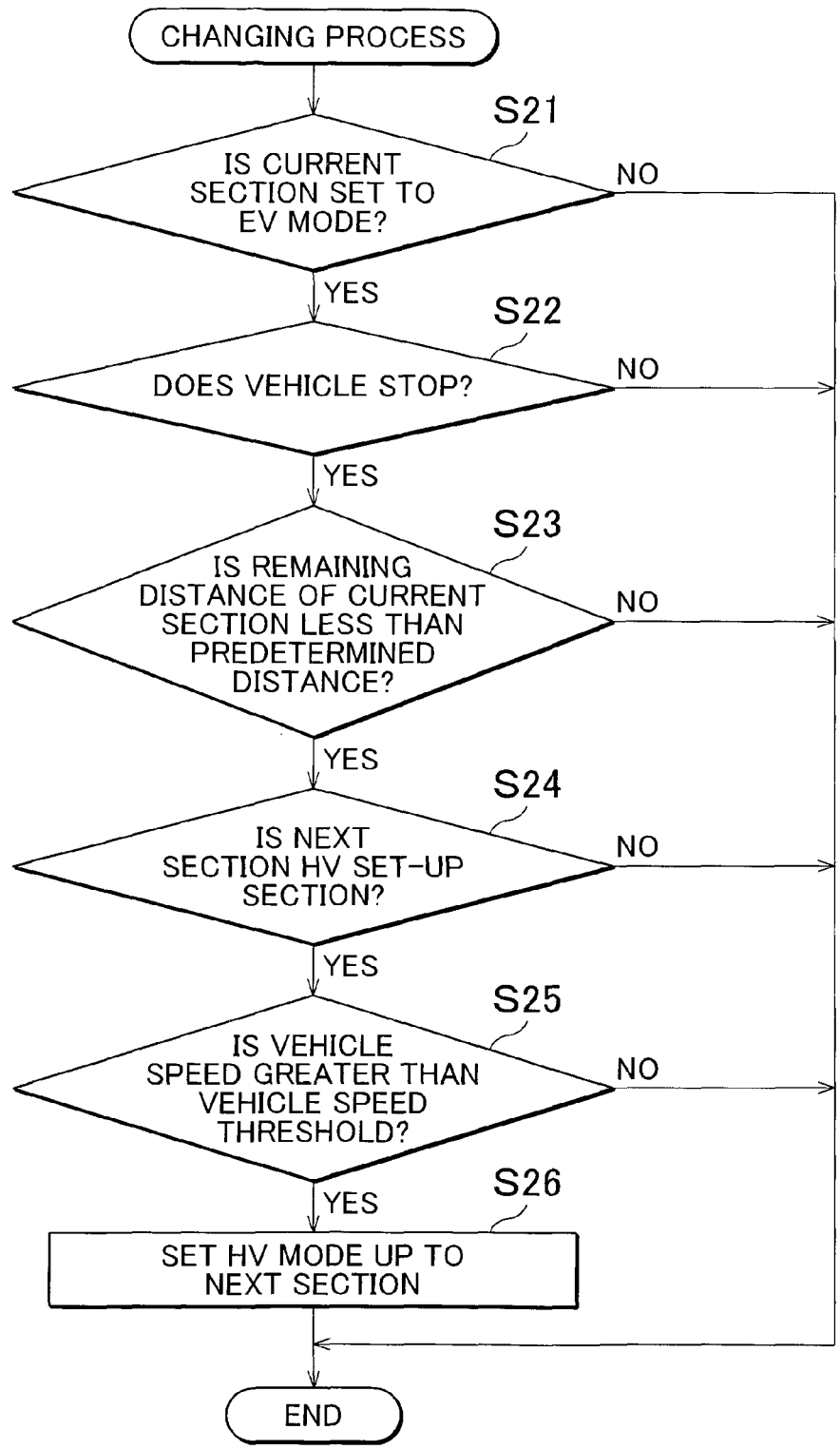
FIG. 4 is a flowchart illustrating a process flow of a driving mode changing process that is performed by the movement support apparatus according to the first embodiment.

As illustrated in FIG. 4, when the driving mode is set up by the mode setup unit 124*a*, the mode changing unit 108*a* determines whether the driving mode of the section in which the vehicle is currently running is, the EV mode (step S21). That is, the mode changing unit 108*a* determines whether the driving mode is the EV mode for extending the running distance. When the driving mode of the section in which the vehicle is currently running is not the EV mode (NO in step S21), the mode changing unit 108*a* ends the driving mode changing process. That is, the driving mode is switched depending on the driving mode set up by the mode setup unit 124*a*.

On the other hand, when it is determined that the driving mode of the section in which the vehicle is currently running is the EV mode (YES in step S21), the mode changing unit 108*a* determines whether the vehicle 100 is stopped (step S22). When it is determined that the vehicle 100 is not stopped (NO in step S22), the mode changing unit 108*a* ends the changing of the driving mode.

When it is determined that the vehicle 100 is stopped (YES in step S22), the mode changing unit 108*a* determines whether the remaining distance of the section in which the vehicle is currently running is less than a predetermined distance (step S23). When it is determined that the remaining distance of the section in which the vehicle is currently running is not less than the predetermined distance (NO in step S23), the mode changing unit 108*a* ends the changing of the driving mode.

On the other hand, when it is determined that the remaining distance of the section in which the vehicle is currently running is less than the predetermined distance (YES in step S23), the mode changing unit 108*a* determines whether the driving mode set up for a next section is the HV mode (step S24). When it is determined that the driving mode set up for the next section is not the HV mode (NO in step S24), the mode changing unit 108*a* ends the changing of the driving mode.

When it is determined that the driving mode set up for the next section is the HV mode (YES in step S24), the mode changing unit 108*a* determines whether the speed of the vehicle 100 is greater than a vehicle speed threshold (step S25). When it is determined that the speed of the vehicle 100 is not greater than the vehicle speed threshold (NO in step S25), the mode changing unit 108*a* ends the changing of the driving mode.

On the other hand, when it is determined that the speed of the vehicle 100 is greater than the vehicle speed threshold (YES in step S25), the mode changing unit 108*a* sets the HV mode for the section in which the vehicle is currently running up to the next section (step S26) and ends the changing of the driving mode.

An operation when the vehicle 100 is stopped at the red color of the signal lamp of the traffic signal, which is located immediately before the second section k2, in the first section k1 illustrated in FIG. 2 will be described below.

It is assumed that the driving mode changing process is performed in the change cycle at the time of stopping the vehicle 100. Then, the mode changing unit 108*a* performs step S22 illustrated in FIG. 4 because the vehicle 100 runs in the EV mode in the first section k1, and performs step S23 because the vehicle 100 is stopped. Subsequently, the mode changing unit 108*a* performs step S24 because the traffic signal is present at a position at which the remaining distance in the first section k1 as the current section is less than the predetermined distance, and performs step S25 because the driving mode of the second section k2 as the next section is set up as the HV mode. When the signal lamp of the traffic signal is changed to blue, the vehicle 100 is started, and the speed of the vehicle 100 becomes greater than the vehicle speed threshold, the mode changing unit 108*a* sets the driving mode up to the second section k2 which is the next section to the first section k1 to the HV mode (step S26). Accordingly, as illustrated in FIG. 2, when the vehicle 100 is stopped while running in the EV mode in the first section k1 and then runs at a higher speed than the vehicle speed threshold, the vehicle runs in the HV mode up to the second section k2 of which the driving mode is set up to the HV mode. The mode changing unit 108a displays the EV mode, which is the driving mode set up for a part of the section in which the driving mode is set up to the EV mode but the vehicle runs in the HV mode, on the display device 113.

In this embodiment, on the condition that the vehicle 100 is stopped while running in the EV mode and the speed of the vehicle 100 is greater than the vehicle speed threshold in this way, the running in the EV mode is changed to the running in the HV mode. Accordingly, since the running in the EV mode can be avoided at the time of acceleration in which the energy of the battery 110 is more consumed, the rapid decrease in the state of charge of the battery 110 is suppressed and thus the running distance in the EV mode can be extended. As a result, it is possible to provide a movement support apparatus, a movement support method, and a driving support system that can promote proper switching of a driving mode for a section in a driving route.

As described above, this embodiment can achieve the following advantages. (1) The driving mode is changed to a driving mode other than the driving mode set up for a part of a section in a driving route depending on the running load. Accordingly, the possibility that the driving mode in a part of the section in the driving route will be changed to an appropriate driving mode is enhanced, that is, the proper switching of the driving mode for the set section is promoted.

(2) The driving mode is changed to the HV mode on the condition that the vehicle 100 during running in the EV mode is temporarily decelerated and then accelerated. In general, the energy consumption increases when the vehicle is accelerated while running in the EV mode, and the energy consumption more increases particularly when the vehicle is decelerated and then accelerated. Accordingly, the rapid decrease in the state of charge of the battery is suppressed and it is thus possible to extend the running distance in the EV mode.

(3) The driving mode is changed to the HV mode on the condition that the remaining distance in the section (first section k1), for which the EV mode is set up, up to the next section (second section k2) is less than a predetermined distance. Accordingly, only when the remaining distance up to the next section for which the HV mode is set up is small, the vehicle runs in the HV mode which is a driving mode other than the EV mode set up for the section and it is thus possible to suppress discomfort due to the change of the driving mode at the time of entering a new section.

(4) The driving mode is changed to the HV mode on the condition that the HV mode is set up for a section (second section k2) next to the section (first section k1) for which the EV mode is set up. Accordingly, even when the vehicle runs in the HV mode in the section (first section k1) for which the EV mode is set up, the vehicle subsequently runs in the HV mode is set up in the section (second section k2) for which the HV mode and it is thus possible to suppress discomfort due to running in another driving mode.

(5) The determination of whether to change the driving mode by the use of the mode changing unit 108a is performed in a cycle shorter than a setup cycle by the mode setup unit 124a. Accordingly, even when the state of charge of the battery 110 varies due to a traffic flow or the like, an appropriately driving mode can be newly allocated by determining whether to change the driving mode in a relatively short cycle.

The first embodiment may be embodied in the following modifications. In the first embodiment, the EV mode as the driving mode set up for a part of the section of which the driving mode is set to the EV mode but in which the vehicle runs in the HV mode is displayed on the display device 113. However, for the part of the section of which the driving mode is set to the EV mode but in which the vehicle runs in the HV mode, the HV mode may be displayed on the display device 113 so as to correspond to actual running.

Figure 5:
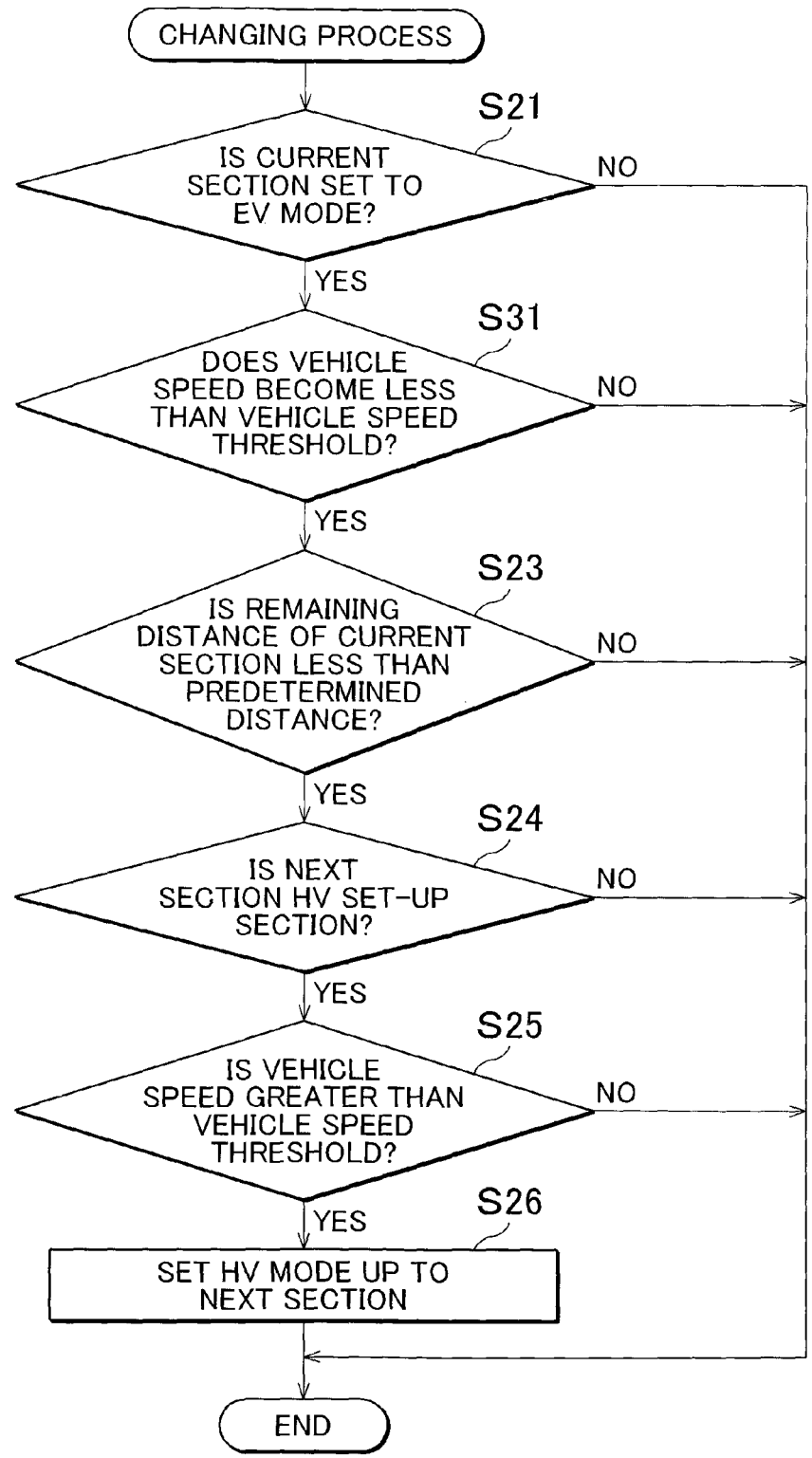
FIG. 5 is a flowchart illustrating a process flow of a driving mode changing process that is performed by a movement support apparatus according to a modification example.

In the first embodiment, the changing of the driving mode is carried out on the condition that the vehicle 100 is stopped. However, the changing of the driving mode may be carried out on the condition that the speed of the vehicle 100 becomes less than the vehicle speed threshold instead of the condition that the vehicle 100 is stopped. That is, when the vehicle 100 is decelerated to the vehicle speed threshold value as the determination value and is then accelerated without stopping the vehicle 100, the driving mode is changed from the EV mode to the HV mode. For example, as illustrated in FIG. 5, the mode changing unit 108a determines whether the speed of the vehicle 100 becomes less than the vehicle speed threshold (step S31) after determining that the driving mode of the section in which the vehicle is currently running is the EV mode as illustrated in FIG. 4 (YES in step S21). When it is determined that the speed of the vehicle 100 becomes less than the vehicle speed threshold (YES in step S31), the mode changing unit 108a performs the same processes as subsequent to step S23 of FIG. 4.

Figure 6:
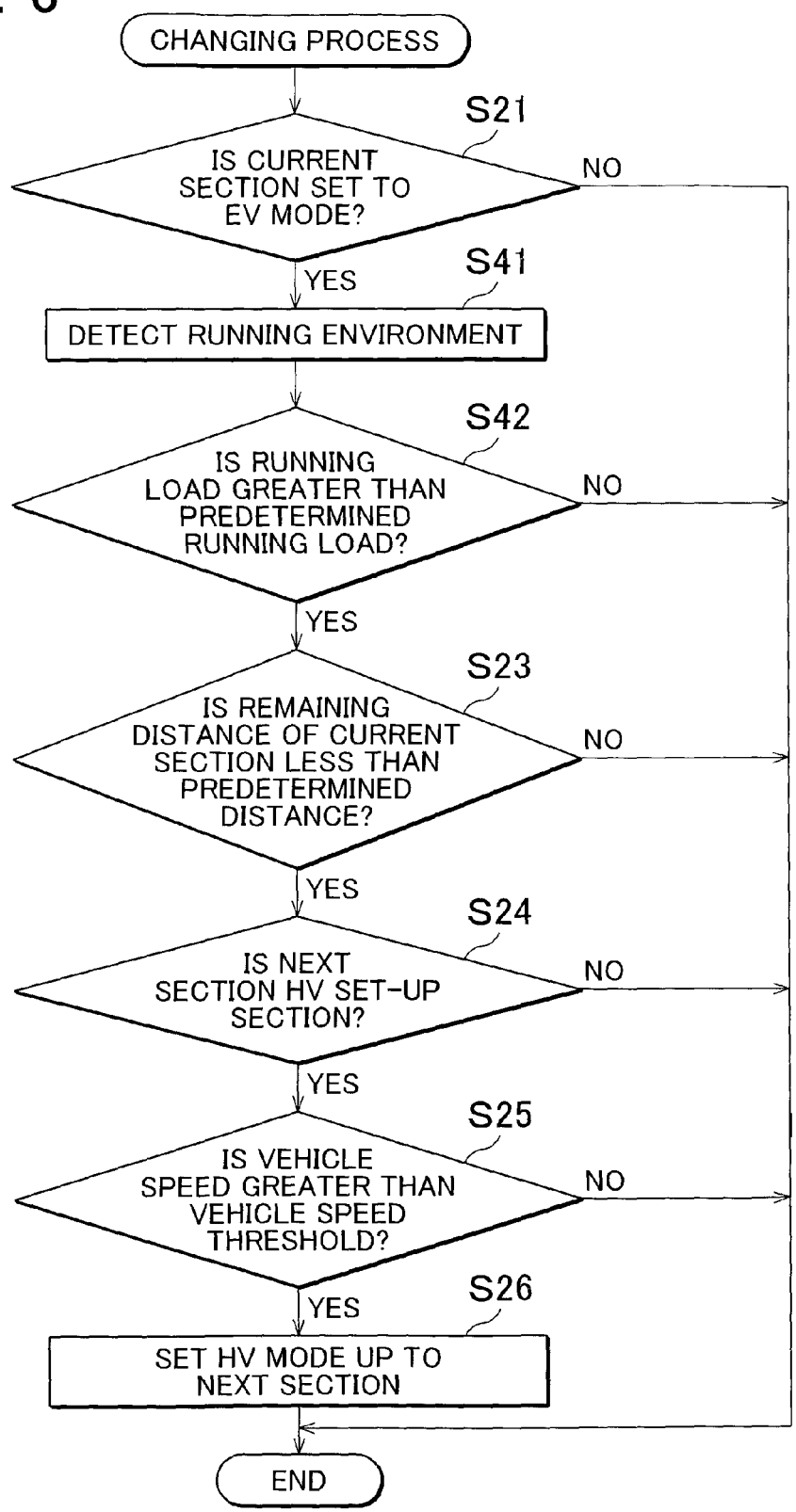
FIG. 6 is a flowchart illustrating a process flow of a driving mode changing process that is performed by a movement support apparatus according to another modification example.

In the first embodiment, the changing of the driving mode is carried out on the condition that the vehicle 100 is stopped. However, the changing of the driving mode may be carried out on the condition that a running load is present as the detection result of the running environment of the vehicle 100 instead of the condition that the vehicle 100 is stopped. For example, as illustrated in FIG. 6, the mode changing unit 108a detects the running environment including the running state of the vehicle 100 and the road environment from the map information database 111, the onboard camera 102, or the like (step S41) after determining that the driving mode of the section in which the vehicle is currently running is the EV mode (YES in step S21) as illustrated in FIG. 4. When it is determined that the running load assumed to be applied to the vehicle 100 is greater than a predetermined running load (YES in step S42), the mode changing unit 108a performs the same processes as subsequent to step S23 of FIG. 4.

In the first embodiment, the order of steps S21 to S24 illustrated in FIG. 4 may be changed. The order of steps S21, S31, S23, and S24 illustrated in FIG. 5 may be changed. The order of steps S21, S41, S42, S23, and S24 illustrated in FIG. 6 may be changed.

Second Embodiment

Figure 7:
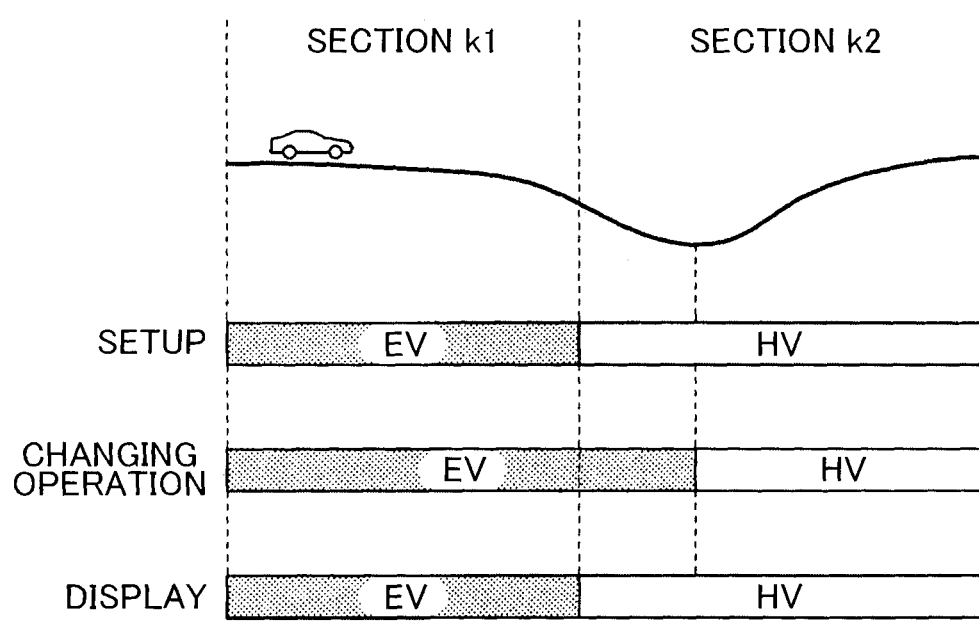
FIG. 7 is a diagram illustrating a part of a driving route that is set up by a movement support apparatus according to a second embodiment of the invention.

A movement support apparatus, a movement support method, and a driving support system according to a second embodiment of the invention will be described with reference to FIGS. 7 and 8. The movement support apparatus and the movement support method according to this embodiment are different from those according to the first embodiment, in that the driving mode is changed from the HV mode to the EV mode when regenerative energy is obtained in a part of a section in which the driving mode is set up to the HV mode. Description will be made below centered on differences from the first embodiment.

In general, since the drive mode is set in units of sections uniformly defined for each link of map data or the like, the EV mode may be suitable for a part of a section for which the HV mode is set up.

Accordingly, the mode changing unit 108a changes the driving mode in a part of a section in a driving route to a driving mode other than the driving mode set up by the mode setup unit 124a depending on the running load. The mode changing unit 108a performs the changing of the driving mode depending on a predetermined condition. An example of the predetermined condition is a combination of a condition that the driving mode of a section in which the vehicle is currently running is set up to the EV mode, a condition that the vehicle enters a section for which the HV mode is set up from a section for which the EV mode is set up, and a condition that regenerative energy is currently obtained.

An example of the driving route to be subjected to the setup or changing of the driving mode will be described below with reference to FIG. 7. As illustrated in FIG. 7, it is assumed that a part of the driving route searched for by the navigation system 112 includes a first section k1 and a second section k2. A downhill road is present over the first section k1 and the second section k2. That is, the boundary between the first section k1 and the second section k2 is located in the way of the downhill road. The vehicle 100 obtains regenerative energy when running in the EV mode in the downhill road. It is assumed that information on the running load and the energy consumption in each of the first section k1 and the second section k2 is acquired from the map information database 111. The mode setup unit 124a sets up the driving mode on the basis of the state of charge of the battery 110, the running loads and the energy consumption of the first section k1 and the second section k2. The driving mode of the first section k1 is set up to the EV mode. The driving mode of the second section k2 is set up to the HV mode.

An example of a driving mode changing process in the hybrid controller 108 will be described below with reference to FIG. 8. The mode changing unit 108a of the hybrid controller 108 changes the driving mode which has been set up by the mode setup unit 124a after being set up by the mode setup unit 124a of the driving support unit 124. The change cycle which is a cycle of the determination of whether to change the driving mode in the mode changing unit 108a is set to be shorter than a setup cycle which is a cycle of the setup in the mode setup unit 124a.

Figure 8:
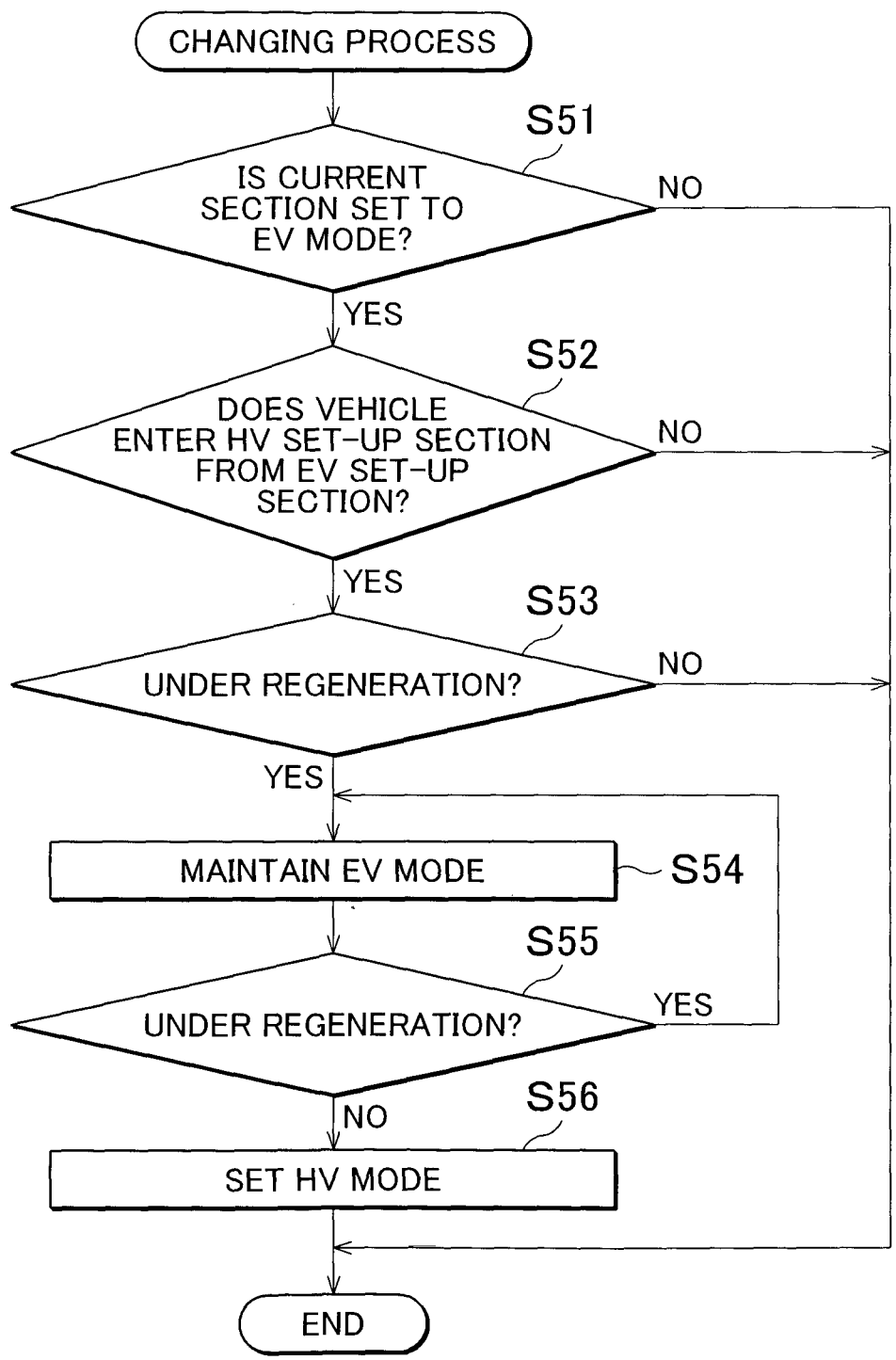
FIG. 8 is a flowchart illustrating a process flow of a driving mode changing process that is performed by the movement support apparatus according to the second embodiment.

As illustrated in FIG. 8, when the driving mode is set up by the mode setup unit 124a, the mode changing unit 108a determines whether the driving mode of the section in which the vehicle is currently running is the EV mode (step S51). That is, the mode changing unit 108a determines whether the driving mode is the EV mode for extending the running distance. When the driving mode of the section in which the vehicle is currently running is not the EV mode (NO in step S51), the mode changing unit 108a ends the driving mode changing process. That is, the driving mode is switched depending on the driving mode set up by the mode setup unit 124a.

On the other hand, when it is determined that the driving mode of the section in which the vehicle is currently running is the EV mode (YES in step S51), the mode changing unit 108a determines whether the vehicle 100 enters the section for which the HV mode is set up from the section for which the EV mode is set up (step S52). When it is determined that the vehicle 100 does not enter the section for which the HV mode is set up from the section for which the EV mode is set up (NO in step S52), the mode changing unit 108a ends the changing of the driving mode.

When it is determined that the vehicle 100 enters the section for which the HV mode is set up from the section for which the EV mode is set up (YES in step S52), the mode changing unit 108a determines whether regeneration in which regenerative energy is obtained is currently progressing (step S53). When it is determined that the regenerative energy is not currently obtained, that is, the regeneration is not progressing, (NO in step S53), the mode changing unit 108a ends the changing of the driving mode.

When it is determined, that the regeneration in which regenerative energy is obtained is currently progressing (YES in step S53), the mode changing unit 108a maintains the EV mode even in the section for which the HV mode is set up (step S54). The mode changing unit 108a determines whether the regenerative energy is currently obtained (step S55). When it is determined that the regenerative energy is currently obtained (YES in step S55), the mode changing unit 108a maintains the EV mode in step S54.

When it is determined that the regenerative energy is not currently obtained (NO in step S55), the mode changing unit 108a sets the driving mode to the HV mode (step S56) and ends the changing of the driving mode. That is, only when the regenerative energy is obtained, the mode changing unit 108a changes the driving mode in the section for which the HV mode is set up to the EV mode.

An operation when the vehicle 100 runs on the downhill road, which is connected to the second section k2, in the first section k1 illustrated in FIG. 7 will be described below. It is assumed that the driving mode changing process is performed in the change cycle when the vehicle 100 runs. Then, the mode changing unit 108a performs step S52 illustrated in FIG. 8 because the vehicle 100 runs in the EV mode in the first section k1, and performs step S53 because the vehicle 100 enters the section for which the HV mode is set up from the section for which the EV mode is set up. Subsequently, the mode changing unit 108a performs step S54 because the regeneration in which the regenerative energy is currently obtained is progressing, and maintains the EV mode from the first section k1 by changing the driving mode of the second section k2 as the next section to the EV mode. Then, when the regenerative energy is not obtained, the mode changing unit 108a sets the driving mode to the HV mode (step S26). Accordingly, as illustrated in FIG. 7, when the vehicle 100 enters the second section k2 while obtaining the regenerative energy during running in the EV mode in the first section k1, the driving mode is set to the EV mode until the regenerative energy is not obtained. The mode changing unit 108a displays the HV mode, which is the driving mode set up for a part of the section in which the driving mode is set up to the HV mode but the vehicle runs in the EV mode, on the display device 113.

In this embodiment, the running in the HV mode is changed to the running in the EV mode on the condition that the regenerative energy is obtained when the vehicle 100 runs in the EV mode and the vehicle enters the section for which the HV mode is set up. Accordingly, since the regenerative energy is obtained and thus the state of charge of the battery 110 increases, it is possible to extend the running distance in the EV mode. As a result, it is possible to provide a movement support apparatus, a movement support method, and a driving support system that can promote proper switching of a driving mode for a section in a driving route.

As described above, according to this embodiment, the following advantages can be achieved in addition to the advantages of (1) and (5) in the first embodiment. (6) When the vehicle enters a section (second section k2) for which the HV mode is set up from a section (first section k1) for which the EV mode is set up, the driving mode in the section (second section k2) for which the HV mode is set up is changed to the EV mode on the condition that the regenerative energy is obtained. That is, when the vehicle 100 enters the section (second section k2) for which the HV mode is set up and the recovery of the battery 110 is predicted by acquiring the regenerative energy, the EV mode is maintained even in the section (second section k2) for which the HV mode is set up depending on the section in which the regenerative energy is obtained. That is, some sections in which the regenerative energy is obtained is added to the running distance in the EV mode and thus the running distance in the EV mode is extended.

The above-mentioned embodiment may be embodied in the following modifications. In the second embodiment, the HV mode as the driving mode set up for a part of the section of which the driving mode is set to the HV mode but in which the vehicle runs in the EV mode is displayed on the display device 113. However, for the part of the section of which the driving mode is set to the HV mode but in which the vehicle runs in the EV mode, the EV mode may be displayed on the display device 113 so as to correspond to actual running.

In the second embodiment, when the regenerative energy is not obtained, the driving mode of the section for which the HV mode is set up is changed from the EV mode to the HV mode. However, the driving mode may be re-changed to the HV mode which is the set-up driving mode, on at least one condition that a predetermined time elapses and the vehicle runs a predetermined time after the driving mode of the section for which the HV mode is set up is changed to the EV mode. Accordingly, since the driving mode can be changed to the optimal EV mode for only a part of the section for which the HV mode is set up and can be returned to the driving mode suitable for the entire section, it is possible to optimize the driving mode.

Elements which are common to the above-mentioned embodiments and which can be modified will be described below. In the above-mentioned embodiments, the CAN is used as the onboard network. The invention is not limited to this configuration, but other networks such as Ethernet (registered trademark), FlexRay (registered trademark), and IEEE1394 (FireWire (registered trademark)) may be used as the onboard network as long as they can connect the ECU and the like connected thereto so as to communicate. The networks including the CAN may be combined. Accordingly, it is possible to achieve improvement in a degree of freedom in configuration of the vehicle employing the movement support apparatus.

In the above-mentioned embodiments, the navigation system 112 and the driving support unit 124 are provided as different configurations. The invention is not limited to this configuration but the navigation system and the driving support unit may be provided as the same unit. Accordingly, it is possible to achieve improvement in a degree of freedom in configuration of the movement support apparatus.

In the above-mentioned embodiments, the hybrid controller 108 and the driving support unit 124 are provided as different configurations. The invention is not limited to this configuration, but the hybrid controller and the driving support unit may be provided as the same unit. Accordingly, it is possible to achieve improvement in a degree of freedom in configuration of the movement support apparatus.

In the above-mentioned embodiments, the units such as the navigation system 112, the display device 113, and the onboard controller 120 are incorporated into the vehicle 100. The invention is not limited to this configuration, but the units such as the navigation system, the display device, and the onboard controller may employ a portable information processor such as a mobile phone or a smart phone as all or a part of the functions thereof as long as they can communicate with each other. Accordingly, it is possible to achieve improvement in a degree of freedom in design of the movement support apparatus.

In the above-mentioned embodiments, the driving support unit 124, the navigation system 112, the map information database 111, and the like are incorporated into the vehicle 100. The invention is not limited to this configuration, but some functions of the driving support unit, the navigation system, the map information database, and the like may be disposed in an information processor outside the vehicle or may be disposed in a portable information processor. An example of the information process outside the vehicle is an information processing center and examples of the portable information processor include a mobile phone and a smart phone. The information processor outside the vehicle only has to transmit and receive information via a radio communication line. The portable information process may be connected to the onboard network, may be connected thereto by short-range communications, or may transmit and receive information via a radio communication line. Accordingly, it is possible to achieve improvement in a degree of freedom in design of the movement support apparatus.

In the above-mentioned embodiments, the running load of a section in a driving route is acquired or calculated from information included in the map information database. The invention is not limited to this configuration, but the running load of the section in the driving route may be acquired or calculated from a learning database. For example, as for a route in which the running is stored, the running load required for previously running in the route, which is stored in the learning database, can be used. Accordingly, it is possible to achieve improvement in a degree of freedom in design of the movement support apparatus.

In the above-mentioned embodiments, the EV mode is allocated in the ascending order in the running load of the sections. The invention is not limited to this configuration, but the EV mode may be allocated to the sections on the basis of one or more information pieces included in the map data such as the gradient of a road, a legal speed limit, and a road type, as long as the EV mode can be appropriately allocated. The EV mode may be allocated to the sections on the basis of the efficiency of the internal combustion engine or the efficiency of the battery. Accordingly, it is possible to achieve improvement in a degree of freedom in design of the movement support apparatus.

Figure 9:
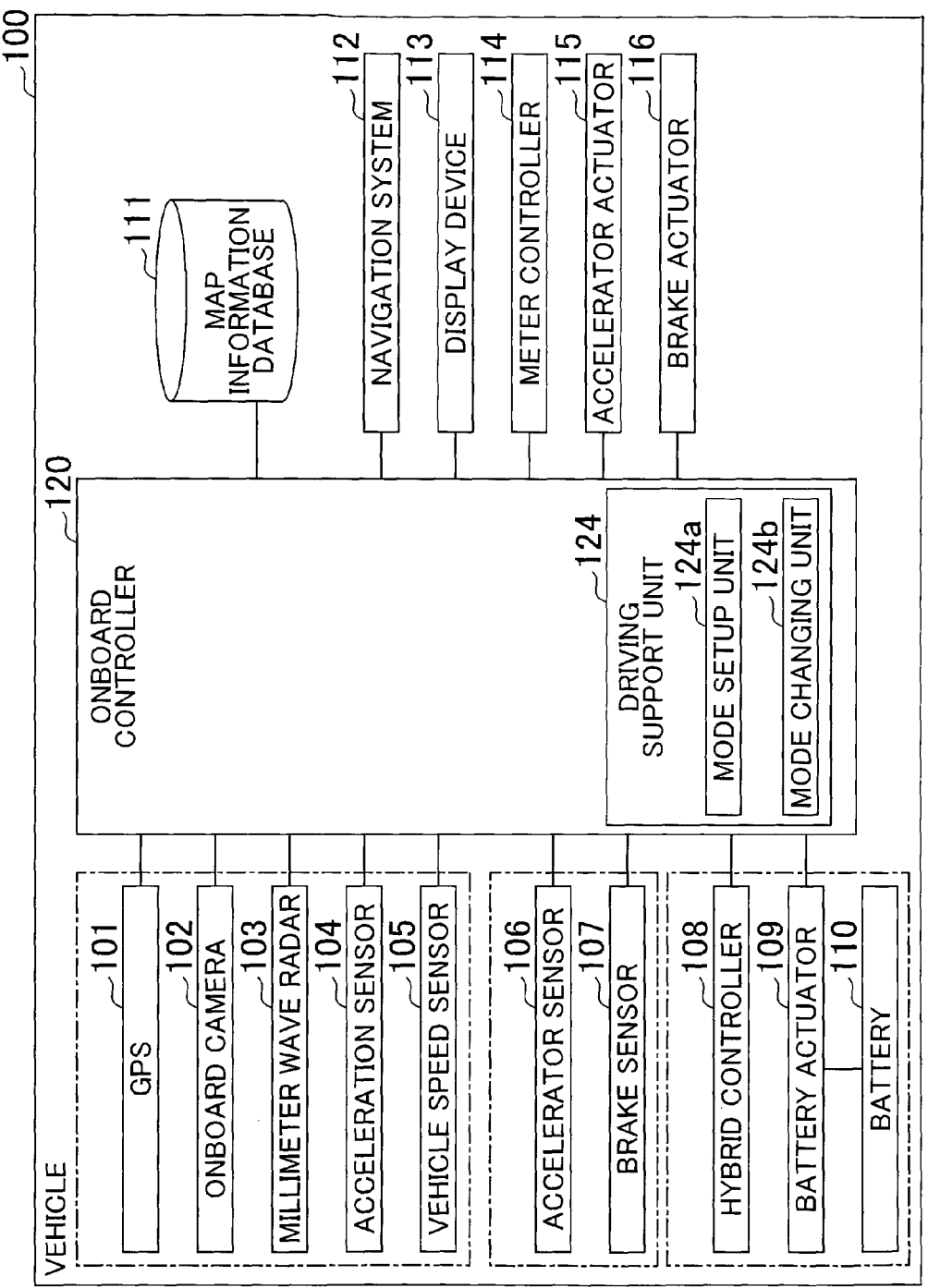
FIG. 9 is a block diagram schematically illustrating a configuration of a movement support apparatus according to a modification example.

In the above-mentioned embodiments, the changing of the set-up driving mode is performed by the hybrid controller 108 (mode changing unit 108a). The invention is not limited to this configuration, but the changing of the set-up driving mode may be performed by the driving support unit 124 (mode changing unit 124b) or the like as illustrated in FIG. 9. Accordingly, it is possible to achieve improvement in a degree of freedom in design of the movement support apparatus.

In the above-mentioned embodiments, the allocation of the driving mode is performed by the driving support unit 124. The invention is not limited to this configuration, but the allocation of the driving mode may be performed by the hybrid controller or the like. Accordingly, it is possible to achieve improvement in a degree of freedom in design of the movement support apparatus.

In the above-mentioned embodiments, the allocation of the driving mode is mainly performed when the position of the vehicle 100 is the current point, but the allocation of the driving mode may be performed at any point of the driving route in which the vehicle moves to a destination. The appropriate allocation of the driving mode to all the sections of the driving route can be performed at any point. Accordingly, it is possible to achieve improvement in a degree of freedom in design of the movement support apparatus.

In the above-mentioned embodiments, the virtual running load is set to sequentially decrease from a section close to the current point in the driving route. However, the same virtual running load may be set. In the above-mentioned embodiments, the energy consumption is sequentially added from the section close to the current point in the driving route, the virtual running load is set in a section in which the added consumption energy is greater than an energy threshold value, and the driving mode of a section having a relatively small running load including the virtual running load is set up to the EV mode. However, the HV mode may be set for a section before the section in which the regenerative energy is obtained.

In the above-mentioned embodiments, a condition that the distance to the destination is equal to or greater than a predetermined distance is used as the condition for preferentially setting up the HV mode for a section close to the current point. However, this condition may be skipped when the HV mode is preferentially set up for the section close to the current point regardless of the distance to the destination.

In the above-mentioned embodiments, the change cycle which is the cycle for determining whether to change the set-up driving mode is set to be shorter than the setup cycle which is the cycle for setting up the driving mode. However, when the setup cycle is sufficiently short, the change cycle and the setup cycle may be set to the same value.

What is claimed is:

1. A movement support apparatus that supports movement of a vehicle having an internal combustion engine and a motor as drive sources from a current location to a destination, comprising:
   a setup unit that sets up any driving mode of an EV mode in which the motor using a battery is used as the drive source and an HV mode in which at least the internal combustion engine is used as the drive source for each section, into which a driving route from the current location to the destination is partitioned, when a running load for running in each section is set; and
   a change unit that changes the driving mode in a part of each section of the driving route to a driving mode other than the driving mode set up by the setup unit based on at least one of a running environment including a running state of the vehicle and a road environment and the running load as consumption of the battery necessary for running in the EV mode,
   wherein the change unit changes the driving mode of the section, for which the EV mode is set up, to the HV mode on a condition that the vehicle is decelerated and then accelerated in the section, for which the EV mode is setup.

2. The movement support apparatus according to claim 1, wherein the change unit changes the driving mode of the section, for which the EV mode is set up, to the HV mode on a condition that a remaining distance in the section, for which the EV mode is setup, up to a next section is less than a predetermined distance.

3. The movement support apparatus according to claim 1, wherein the change unit changes the driving mode of the section, for which the EV mode is set up, to the HV mode on a condition that the HV mode is set up for the section next to the section, for which the EV mode is setup.

4. The movement support apparatus according to claim 1, wherein the change unit changes the driving mode of the section in which regenerative energy is obtained from the HV mode to the EV mode when the regenerative energy is obtained at a time of entry from the section for which the EV mode is set up by the setup unit into the section for which the HV mode is set up.

5. The movement support apparatus according to claim 1, wherein the change unit re-changes the driving mode of the section, for which the HV mode is set up, to the HV mode when at least one condition of a condition that a predetermined time elapses after the driving mode of the section for which the HV mode is set up is changed to the EV mode and a condition that the vehicle runs a predetermined distance thereafter is satisfied.

6. The movement support apparatus according to claim 1, wherein determination of whether to change the driving mode by the change unit is performed in a cycle shorter than a setup cycle by the setup unit after the driving mode of the vehicle is set up by the setup unit.

7. A movement support method of supporting movement of a vehicle having an internal combustion engine and a motor as drive sources from a current location to a destination, comprising:
   setting up any driving mode of an EV mode in which the motor using a battery is used as the drive source and an HV mode in which at least the internal combustion engine is used as the drive source for each section, into which a driving route from the current location to the destination is partitioned, when a running load for running in each section is set;
   changing the driving mode in a part of each section of the driving route to a driving mode other than the set-up driving mode based on at least one of a running environment including a running state of the vehicle and a road environment and the running load as consumption of the battery necessary for running in the EV mode; and
   changing the driving mode of the section, for which the EV mode is set up, to the HV mode on a condition that the vehicle is decelerated and then accelerated in the section, for which the EV mode is setup.

8. A driving support system that supports driving of a vehicle having an internal combustion engine and a motor as drive sources based on one driving mode selected from a plurality of driving modes different from each other, which is set up for sections into which a driving route of the vehicle is partitioned from a current location to a destination, comprising:
   the movement support apparatus according to claim 1 that sets up one driving mode selected from the plurality of driving modes for each section of the driving route and changes the driving mode if necessary.

9. A movement support apparatus that supports movement of a vehicle having an internal combustion engine and a motor as drive sources from a current location to a destination, comprising:
   a setup unit that sets up any driving mode of an EV mode in which the motor using a battery is used as the drive source and an HV mode in which at least the internal combustion engine is used as the drive source for each section, into which a driving route from the current location to the destination is partitioned, when a running load for running in each section is set; and
   a change unit that changes the driving mode in a part of each section of the driving route to a driving mode other than the driving mode set up by the setup unit based on at least one of a running environment including a running state of the vehicle and a road environment and the running load as consumption of the battery necessary for running in the EV mode, wherein the change unit changes the driving mode of the section in which regenerative energy is obtained from the HV mode to the EV mode when the regenerative energy is obtained at a time of entry from the section for which the EV mode is set up by the setup unit into the section for which the HV mode is set up.

10. The movement support apparatus according to claim 9, wherein the change unit re-changes the driving mode of the section, for which the HV mode is set up, to the HV mode when at least one condition of a condition that a predetermined time elapses after the driving mode of the section for which the HV mode is set up is changed to the EV mode and a condition that the vehicle runs a predetermined distance thereafter is satisfied.

11. The movement support apparatus according to claim 9, wherein determination of whether to change the driving mode by the change unit is performed in a cycle shorter than a setup cycle by the setup unit after the driving mode of the vehicle is set up by the setup unit.

* * * * *

UNITED STATES PATENT AND TRADEMARK OFFICE
CERTIFICATE OF CORRECTION

PATENT NO. : 9,499,161 B2  
APPLICATION NO. : 15/025772  
DATED : November 22, 2016  
INVENTOR(S) : Yuki Ogawa Page 1 of 1

It is certified that error appears in the above-identified patent and that said Letters Patent is hereby corrected as shown below:

On the Title Page

Item (54) and in the Specification, Column 1 in the Title, delete "ADAPTIVE" and insert --ADAPTATIVE--, therefore.

Signed and Sealed this
Twenty-fifth Day of April, 2017

Michelle K. Lee
*Director of the United States Patent and Trademark Office*